United States Patent [19]  
Kitamura et al.

[11] Patent Number: 4,943,011  
[45] Date of Patent: Jul. 24, 1990

[54] SEAT BELT RETRACTOR WITH TENSION-REDUCING WINDING MECHANISM

[75] Inventors: Hideo Kitamura; Ichiro Nakagawa, both of Shiga, Japan

[73] Assignee: Takata Corporation, Tokyo, Japan

[21] Appl. No.: 417,020

[22] Filed: Oct. 3, 1989

[30] Foreign Application Priority Data

Oct. 12, 1988 [JP] Japan .................................. 63-254984

[51] Int. Cl.⁵ ............................................. B60R 22/44
[52] U.S. Cl. ............................ 242/107; 242/107.4 R
[58] Field of Search ......................... 242/107–107.7; 280/802–808; 297/474–480

[56] References Cited

U.S. PATENT DOCUMENTS

| 4,212,435 | 7/1980 | Kawaharazaki | 242/107 |
| 4,303,208 | 12/1981 | Tanaka | 242/107 |
| 4,310,128 | 1/1982 | Morita et al. | 242/107 |
| 4,382,563 | 5/1983 | Morita et al. | 242/107 |
| 4,383,658 | 5/1983 | Morita et al. | 242/107.4 X |
| 4,483,494 | 11/1984 | Takada | 242/107 |
| 4,564,153 | 1/1986 | Morinaga et al. | 242/107 |
| 4,809,925 | 3/1989 | Takada | 242/107 |

Primary Examiner—Stuart S. Levy  
Assistant Examiner—Steven M. DuBois  
Attorney, Agent, or Firm—Brumbaugh, Graves, Donohue & Raymond

[57] ABSTRACT

A vehicle seat belt retractor with a tension-reducing mechanism comprises a main winding spring biasing a toothed wheel in the belt-winding direction and an auxiliary winding spring biasing the reel shaft relative to the wheel. The positions of a stopper pawl biased by an over-center spring are controlled by a clutch plate associated with the wheel such that the wheel is stopped by engagement by the pawl after the belt is pulled out and done up, the slack is allowed to be taken up, and the user pulls the belt out slightly, thereby establishing the reduced-tension state. The pawl is released from the wheel to restore the winding bias of the main spring by a releasing clutch ring if more than slightly less than one revolution of the reel is required to take up slack in the belt after the reduced-tension state is attained.

5 Claims, 4 Drawing Sheets

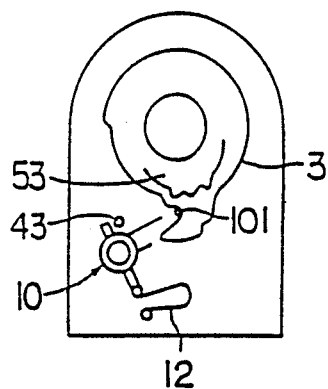
FIG. 4A
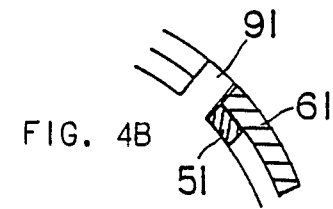
FIG. 4B
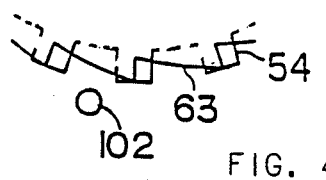
FIG. 4C
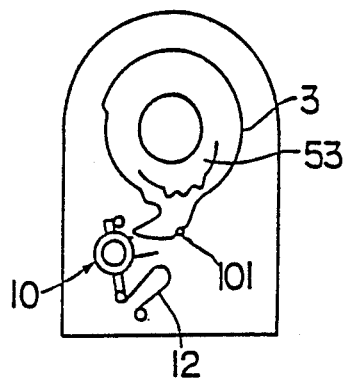
FIG. 5A
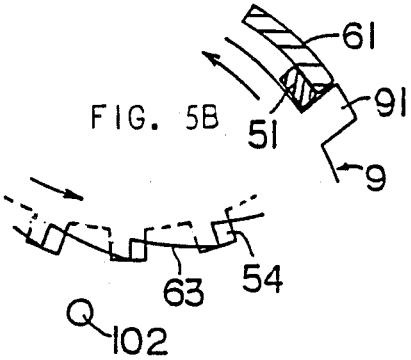
FIG. 5B
FIG. 5C
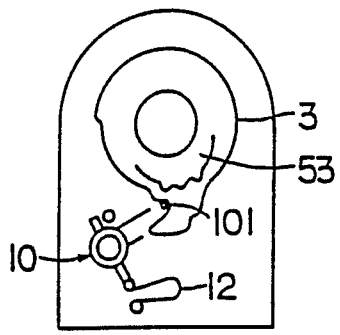
FIG. 6A
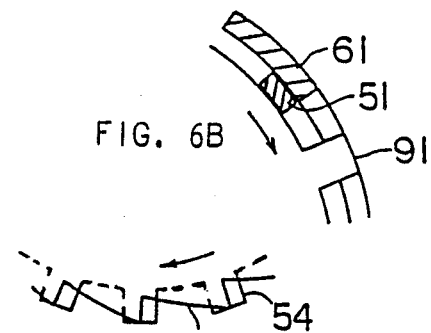
FIG. 6B
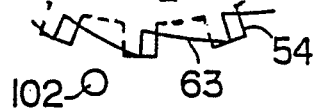
FIG. 6C

SEAT BELT RETRACTOR WITH TENSION-REDUCING WINDING MECHANISM

BACKGROUND OF THE INVENTION

Because the winding spring of a vehicle seat belt retractor can exert a bothersome pressure of the belt against the chest and waist of the vehicle occupant, vehicles are often equipped with seat belt retractors having a winding mechanism in which the belt tension can be reduced or entirely eliminated when the belt is done up. In several previously known designs of windings mechanisms with tension-reduction or tension-elimination features, the occupant pulls the belt out from the retractor, does up the buckle, allows the belt to wind partly back onto the retractor to take up the slack and then pulls the belt out a small amount to place the winding mechanism in the tension-reduced or tensionless mode. There is no problem with these types of retractor if the occupant uses them properly. Some people, however, do not allow the slack to be taken up fully, or they may be leaning forward when they allow the belt to rewind. In these cases, a tensionless retractor allows the belt to remain slackened, and the vehicle occupant is not well protected in case of an accident. With a tension-reduction type of retractor winding mechanism, the force of the auxiliary spring acting on the belt in the tension-reduced mode may not be great enough to take up the slack, especially if the occupant leaves a large amount of slack in the belt when activating the tension-reducing mechanism. Again, the protection of the occupant is diminished.

SUMMARY OF THE INVENTION

One object of the present invention is to provide a vehicle seat belt retractor with an improved winding mechanism of the tension-reduction type, that is, the type in which the winding force applied to the belt reel can be reduced after the belt is done up by the occupant. Another object is to provide a winding mechanism of the tension-reduction type that is of relatively simple mechanical construction, small in size, low in weight and reliable in operation. In preferred embodiments, it is also desired that if the slack in the belt after the tension is reduced requires more than slightly less than one revolution of the belt reel to take up the slack, the winding mechanism will automatically restore the force of the main winding spring to the belt reel, thereby ensuring that the slack will be taken up.

The present invention, more particularly, is an improvement in a known type of seat belt retractor having a belt-winding mechanism that includes a belt reel shaft mounted for rotation in a frame, a toothed wheel mounted for rotation relative to the reel shaft, a main spiral winding spring connected at one end to the frame and at the other end to the toothed wheel and biasing the toothed wheel rotationally in the belt-winding direction, an auxiliary spiral winding spring connected at one end to the toothed wheel and at the other end to the reel shaft to bias the reel shaft in the belt-winding direction relative to the toothed wheel, and means for stopping rotation of the toothed wheel in the belt-winding direction to remove the bias of the main winding spring including a stopper pawl engageable with the toothed wheel. When the toothed wheel is permitted to rotate, the main spring and auxiliary spring work together in series to rotate the reel in the belt-winding direction. When the toothed wheel is stopped from rotating, only the force of the auxiliary spring is applied to the belt reel shaft, and the belt tension is reduced to a more comfortable level.

The present invention is characterized in that the toothed wheel has ratchet teeth engageable by the stopper pawl such as to be prevented from rotating in the belt-winding direction upon such engagement, in that an over-center spring is connected between the reel frame and the stopper pawl and biases the pawl toward or away from engagement with the ratchet teeth of the toothed wheel, depending on the position to which the stopper pawl is moved, and in that a clutch plate is coupled by a clutch spring to the toothed wheel and has cam surfaces engageable with a control clutch follower pin on the stopper pawl to control the position of the stopper pawl in response to winding and unwinding movements of the belt reel shaft such as to hold the stopper pawl out of engagement into the ratchet teeth when the belt is unwound from the reel and is then allowed to partly rewind onto the reel and to enable the pawl to engage the ratchet teeth and prevent rotation of the gear wheel in the belt-winding direction when the belt is pulled out slightly such as to rotate the reel shaft in the belt-unwinding direction after such partial rewinding.

In preferred embodiments, the invention has the following further characteristics:

The clutch plate has a protrusion having a first cam surface on one side engageable with the clutch control follower pin of the stopper pawl upon unwinding rotation of the clutch plate to move the stopper pawl to a first position in which the over-center spring biases it away from engagement with the ratchet teeth of the toothed wheel and a second cam surface on its other side engageable with the clutch control follower pin in response to winding rotation of the clutch plate to move the stopper pawl to a second position in which the over-center spring biases it toward but not into engagement with the ratchet teeth of the toothed wheel. The clutch plate also has a third cam surface engageable with the clutch control follower pin of the stopper pawl that permits the stopper pawl to move from the second position under the bias of the over-center spring to a third position in engagement with the ratchet teeth of the toothed wheel such as to prevent rotation of the toothed wheel in the belt-winding direction.

The toothed wheel has sprocket teeth evenly spaced at a certain pitch distance and projecting from its perimeter, and the stopper pawl has a release follower pin receivable between the sprocket teeth when the stopper pawl is in engagement with a ratchet tooth of the toothed wheel. A release clutch ring is carried by the toothed wheel for limited relative rotation. The release clutch ring has ratchet teeth arranged at the said pitch distance in overlapping relation to the sprocket teeth and engageable upon rotation of the releasing clutch ring in the belt-winding direction relative to the toothed wheel with the release follower pin so as to move the stopper pawl out of engagement with the ratchet tooth of the toothed wheel and enable the main winding spring to drive the toothed wheel in the belt-winding direction.

A coupling plate having a projecting arm is affixed to the reel shaft for rotation therewith, and the release clutch ring has a lug that is engageable by the projecting arm upon rotation of the belt reel in the belt-winding direction so as to rotate the release clutch ring and cause the stopper pawl to be moved out of engagement with the ratchet teeth of the toothed wheel.

The toothed wheel has a lug that is engageable by the projecting arm of the coupling plate to transmit rotational driving force from the toothed wheel to the reel shaft in the belt-winding direction and to transmit rotational driving force from the reel shaft to the toothed wheel in the belt-unwinding direction with lost motion in both rotational directions, such lost motion enabling the auxiliary spring alone to impart rotational driving force to the reel shaft when the stopper pawl engages a ratchet tooth of the toothed wheel.

In a preferred embodiment of the invention, the over-center spring and the clutch plate control the position of the pawl in such a way that after the belt is pulled out and done up, the slack in the belt is taken up under the bias of the main spring and auxiliary spring acting in series. When the occupant pulls the belt out, the third cam surface, which is a depressed surface, of the clutch plate is moved to a position opposite the clutch control follower pin of the stopper pawl, thus enabling the over-center spring to pivot the stopper pawl toward the ratchet teeth of the wheel and engage the tip with the wheel, thereby stopping it and preventing the bias of the main winding spring from being transmitted to the reel. The slack in the belt is taken up by the auxiliary spring, and the reduced-tension state is attained.

If taking up the slack requires more than slightly less than one revolution of the reel, the ratchet teeth of the release clutch ring, which is engaged and rotated by the coupling plate after slightly less than one revolution of the reel, act against the release follower pin on the stopper pawl to pivot the pawl out of engagement with the ratchet teeth on the wheel, thereby restoring the bias of the main spring on the reel and ensuring that the slack in the belt is taken up.

A preferred embodiment is shown in the accompanying drawings and described below.

DESCRIPTION OF THE DRAWINGS

FIGS. 4A to 8C are diagrammatic views, showing elements of the embodiments in different stages of the operation of the winding mechanism. The respective views, i.e., those identified with the letters "A," "B" and "C," of each figure identified by the same number show the elements in the same stage. The figures identified by "A" show the ratchet teeth of the toothed wheel (in part), the clutch plate and the stopper pawl (also in part). The figures identified by "B" show elements of the coupling plate, the releasing clutch ring and the toothed wheel. The figures identified by "C" show portions of the releasing clutch ring and the toothed wheel.

DESCRIPTION OF THE EMBODIMENT

Figure 3:
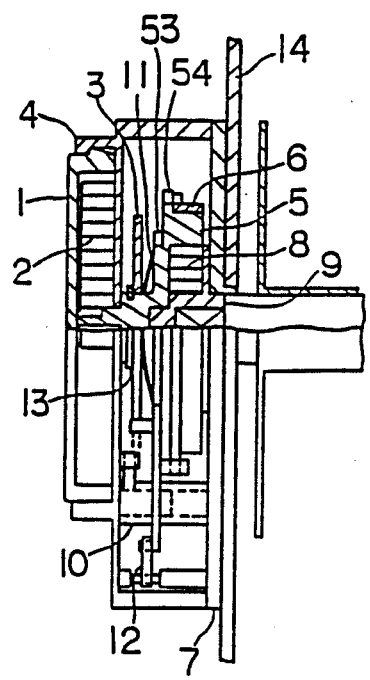
FIG. 3 is a side cross-sectional view taken generally along the axis of rotation of the belt reel.

The winding mechanism is installed in a case 4 that is attached by a mounting plate 7 to one side wall 14 of a U-shaped frame (see FIG. 3). A belt reel is mounted between the two side walls of the frame for rotation by means of a reel shaft, the ends of which extend out through holes in the frame side walls.

A circular flange portion 71 of the mounting plate serves as a bearing for one projecting end of the reel shaft. Outside of the side wall opposite from the one shown in FIG. 3 (and not shown) is an emergency locking mechanism, which may be of any known design, for locking the belt reel against rotation in the belt-unwinding direction in the event of a collision or abrupt stop of the vehicle.

A cover 1 for the outward end portion 41 of the case 4 forms an enclosure for a main spiral winding spring 2 and a fastening point for the outer end of the spring 2. The inner end of the spring 2 is affixed to the wheel 5 by reception in a slot in the end of a shaft portion. The toothed wheel 5, in turn, is mounted for rotation on a shaft portion 95 of a coupling plate 9 that is affixed by a square (or otherwise non-circular) hole 94 in a circular boss 93 of the coupling plate 9 to a correspondingly shaped end portion of the belt reel shaft. Because the cover 1 is affixed to the retractor frame by the case 4, the main spring 2 biases the toothed wheel 5 rotationally relative to the retractor frame. The bias is, of course, in the belt-winding direction.

Figure 1:
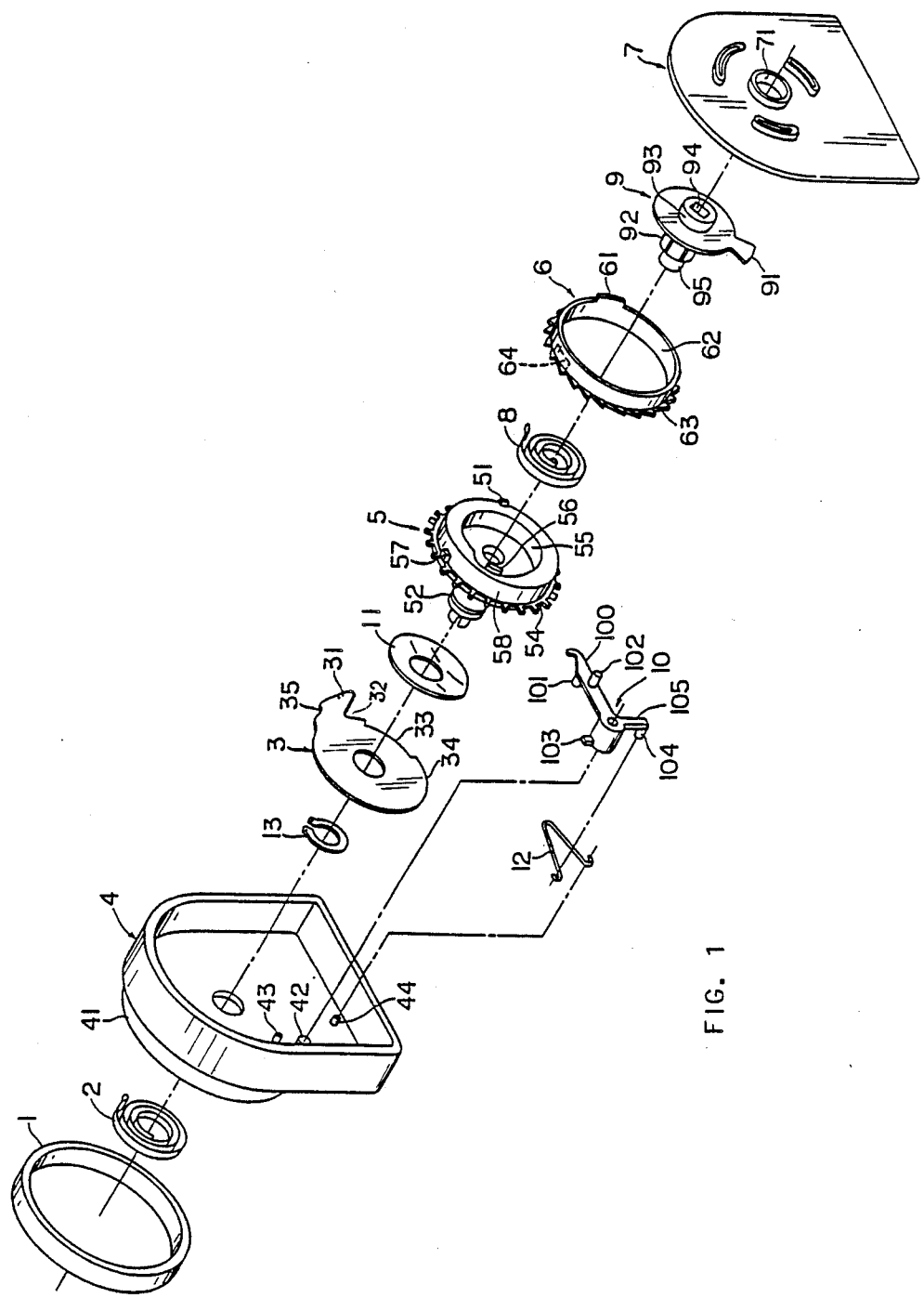
FIG. 1 is an exploded pictorial view of the embodiment.
Figure 2:
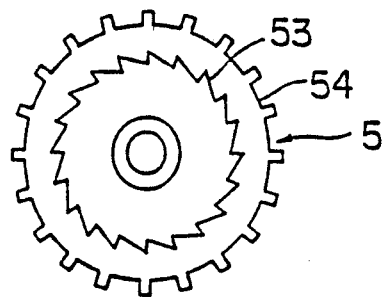
FIG. 2 is an elevational view of the toothed wheel of the embodiment, viewed looking toward the retractor frame (i.e., looking at the outwardly facing aspect with respect to the belt reel)

The rotation of the toothed wheel 5 in the belt-winding direction under the bias of the main spring 2 is stopped when the tip 100 of a stopper pawl 10 engages one of a series of ratchet teeth 53 arranged in a circular row on the outward face of the toothed wheel 5 (see FIG. 2). The stopper pawl 10 pivots on a mounting pin 42 on the case 4 and is biased to rotate either clockwise or counterclockwise about the pin 42 by an over-center spring 12. One end of the spring 12 attached to a pin 44 on the case and the other to a pin 104 on the pawl 10. The extent of rotation of the pawl 10 in the clockwise direction about the pin 42 is limited by engagement of a stop lug 103 on the pawl 10 with a stop pin 43 on the case 4. The direction of the bias applied to the pawl 10 by the spring 12 is determined by its position, which is under the control of a clutch plate 3. The clutch plate 3 is rotatably mounted on the shaft portion of the toothed wheel 5 and is held axially on the shaft portion against the force of a clutch spring 11 received between it and the wheel 5 by a C-ring 13. The clutch spring 11 causes the clutch plate 3 to rotate with the wheel 5 by a frictional force but allows the wheel to rotate relative to the clutch plate when the frictional force is exceeded.

When the clutch plate 3 rotates clockwise with the wheel 5, the clockwise edge of a hook-like protrusion 31 of the clutch plate engages a control clutch follower pin 101 on the stopper pawl and rotates the pawl counterclockwise to move the tip 100 toward the ratchet teeth 53. A raised cam surface 32 immediately adjacent to the protrusion holds the pawl tip away from engagement with the ratchet teeth 53 on the wheel 5, but the over-center spring 12 biases the pawl counterclockwise when the protrusion 31 has pivoted the pawl counterclockwise into engagement with the surface 32.

When the clutch plate is rotated counterclockwise and the pawl is then biased by the spring counterclockwise toward engagement with the ratchet teeth 53, the follower pin 101 encounters and moves up onto a raised cam surface 35 adjacent to the protrusion 31, which surface pivots the pawl clockwise about its mounting pin 42 to an extent sufficient to transfer the over-center spring so that it biases the pawl clockwise, i.e., away from engagement with the ratchet teeth 53. Engagement of the follower pin 101 against a shoulder of the protrusion 31 adjacent to the cam surface 35, together with stopping of the pivoting of the pawl by engagement of the stop lug 103 with the stop pin 43 on the case 4, stops the clutch plate from rotating further in the counterclockwise direction.

A depressed cam surface (in the form of a notch) 33 allows the pawl to pivot counterclockwise under the bias of the over-center spring 12 far enough to engage the pawl tip 100 with the ratchet teeth 53 of the toothed wheel; only when the pawl is biased by the spring 12 counterclockwise toward engagement with ratchet teeth 53 and the cam follower pin 101 engages the depressed cam surface 33 can the pawl tip 100 engage the ratchet teeth 53 and stop the wheel 5 from rotating in the clockwise direction under the bias of the main spring 2.

An auxiliary spiral winding spring 8 is received in a recess 56 in the inward (toward the frame) face of the toothed wheel 5. The outer end of the spring 8 is attached to a boss 56 on the wheel, and the inner end is engaged in a slot 92 in the shaft portion 95 of the coupling member 9. The spring biases the coupling member 9 relative to the wheel 5 in the belt-winding direction.

The wheel 5 has at its circumference a row of equally spaced-apart sprocket teeth, which project outwardly relative to a circular cylindrical surface 58. The stopper pawl has a releasing clutch follower pin 102 that is received between the sprocket teeth 54 when the pawl tip 100 is engaged with the ratchet teeth 53. A releasing clutch ring 6 is received on the surface 58 for rotation, but the extent of rotation is limited by a small boss 57 on the wheel 5 that is received in a groove 64 in the ring 6.

A lug 51 projects from the face of the wheel 5 near its perimeter, and a lug 61 extends from the edge of the releasing clutch ring 6. The circumferential dimensions of the boss 57 and the lug 51 on the wheel 5 are equal, and the circumferential dimensions of the groove 64 and the lug 61 are also equal. The sum of the circumferential spacing between the groove 64 and the lug 61 and the circumferential dimension of the lug 61 is equal to the sum of the circumferential spacing between the boss 57 and the lug 51 and the circumferential dimension of the lug 61. The ring 6 has a circumferential row of ratchet teeth 63 positioned to overlie the sprocket teeth 54. Each ratchet tooth 63 is a length substantially equal to the pitch distance of the sprocket teeth. The teeth face counter-clockwise, which is in opposition to the clockwise belt-winding direction of the retractor. The sloping surface of each tooth acts as a cam surface on the release follower pin 102 of the pawl 10, as described in greater detail below.

The lugs 51 and 61 are positioned to overlap each other radially and to be engaged by an arm 91 on the coupling plate 7 at the ends of a lost motion in either rotational direction (clockwise and counterclockwise) of the coupling plate relative to the wheel 5 and releasing clutch ring 6 of slightly less than one full revolution of the belt reel.

The conditions of the main control components of the winding mechanism when the belt is fully wound onto the reel are shown in FIGS. 4A to 4C. The stopper pawl 10 is biased counterclockwise into engagement with the cam surface 32 of the clutch plate 3 by the over-center spring 12, and its tip 100 does not engage the ratchet tooth 53 (FIG. 4A). The arm 91 engages the counterclockwise-facing edges of the lugs 51 and 61 (FIG. 4B); such engagement causes the ratchet teeth 63 of the releasing clutch ring to be positioned in register (FIG. 4C). Because the pawl 10 is held away from engagement with the ratchet teeth 53 of the wheel 5 by the cam surface 32, the release clutch follower pin 102 is also clear of engagement with the sprocket teeth 54 of the wheel and the ratchet teeth 63 of the releasing clutch ring 6 (FIG. 4C).

When the belt is withdrawn (FIGS. 5A to 5C), the coupling plate 9 rotates counterclockwise with the reel shaft, which through the lost motion between the coupling plate 9 and the wheel 5 soon brings the arm 91 into engagement with the clockwise facing edges of the lugs 51 and 61 (FIG. 5B). In the early stages of unwinding of the belt, the wheel 5 is driven and the main spring 2 is tightened at the urging of the then-tightening auxiliary spring 8. After the lost motion is taken up, the arm 91 rotates the releasing clutch ring 6 relative to the wheel 5 a distance sufficient to move the ratchet teeth 63 across the spaces between the sprocket teeth 54 (FIG. 5C). Upon further rotation of the belt reel, the arm 91 transmits rotation of the coupling plate 9 to the wheel 5 through engagement with the lug 51.

The friction coupling between the wheel 5 and the clutch plate 3 causes the clutch plate to rotate with the wheel through less than one revolution, namely until the clutch plate follower pin 101 is engaged by and rides up on the raised cam surface 35 and the projection 31 is encountered (FIG. 5A). The pawl is pivoted by the cam surface 35 clockwise about its mounting pin 42 enough to shift the over-center spring 12 so that it biases the pawl clockwise, whereupon, the spring 12 moves it to its stop position with the stop lug 103 engaging the stop pin 43. The release clutch follower pin 102 moves farther away from the sprocket teeth and ratchet teeth 63, and the pawl tip 100 moves farther away from the sprocket teeth 54 and the ratchet teeth 53 (FIG. 5C). The conditions of FIG. 5 exist until the length of the belt segment withdrawn from the reel is enough to permit the belt to be done up; the clutch plate, of course, stops rotating, but the wheel 5 can continue to rotate counterclockwise with the reel by a rotational force sufficient to overcome the biases of the springs 2 and 8 and the frictional force generated by the clutch spring 11. As the belt is unwound, the main spring 2 is being tightened to store energy for rewinding the belt. The auxiliary spring, however, is tightened only during the taking up of the lost motion between the wheel 5 and the coupling plate 9 in the beginning stages of belt withdrawal and stops at the end of the lost motion.

After the user buckles up the belt and lets go of it, the main winding spring 2 rotates the wheel 5 clockwise. The clutch plate 3 rotates with the wheel, and the projection 31 encounters the follower pin 101 and moves the stopper pawl 10 counterclockwise, which transfers the over-center spring so that it biases the pawl counterclockwise against the cam surface 32 (FIG. 6A). The rotation of the wheel is transmitted through the auxiliary spring 8 to the reel shaft, which causes some lost motion between the coupling plate 9 and the wheel 5 (FIG. 6B). The pawl tip 100 and the follower pin 102 are held away from the ratchet teeth 53 and 63, so all of the slack can be taken up in the condition of FIG. 6.

Figure 7A:
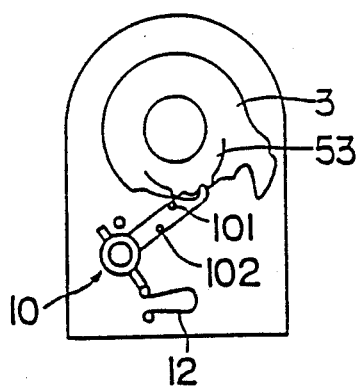
Figure 7B:
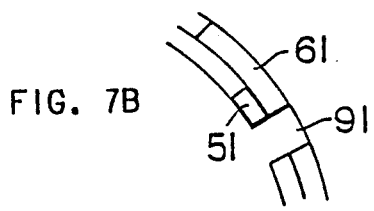
Figure 7C:

After the slack is taken up, the user pulls the belt out a small distance (FIG. 7), and after the lost motion of the coupling plate 9 is taken up (FIG. 7B), the counterclockwise (belt-unwinding) rotation of the reel is transmitted to the wheel 5. Upon rotation of the reel, the wheel and clutch plate are rotated counterclockwise enough to move the depressed cam surface 33 opposite the pawl 10. Under the bias of the over-center spring 12, the pawl is pivoted counterclockwise to bring the tip 100 into engagement with the ratchet teeth 53 of the wheel (FIG. 7A) and the releasing clutch follower pin 102 into engagement with the then-registering ratchet teeth 63 and sprocket teeth 54 (FIG. 7C). Upon such engagements, the wheel is stopped from rotating clockwise (belt-winding) and the bias of the main spring cannot be transmitted to the reel shaft. The wheel 5 can still rotate in the belt-unwinding rotation at this point, however, because the ratchet teeth 53 allow the pawl tip 100 to pass over them by overcoming the bias of the over-center spring 12.

Figure 8A:
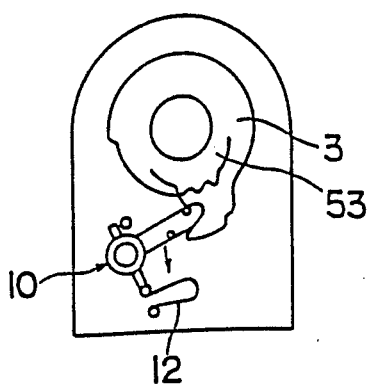
Figure 8B:
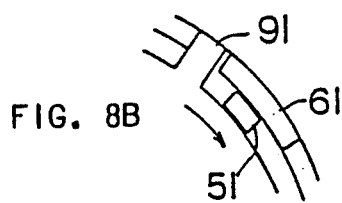
Figure 8C:
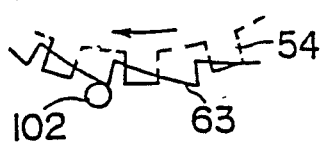

The slack in the belt that was created when it was pulled out to initiate the reduced-tension mode of operation of the winding mechanism (FIG. 7) is taken up by winding of the belt solely under the bias of the auxiliary spring 8, which acts between the now-stopped wheel 5 and the coupling plate 9. If the slack is taken up by rotation of the coupling plate 9 (and the belt reel) of less than nearly one full revolution, the winding mechanism remains in the reduced-tension mode. But if the slack is not taken up in one revolution, the arm 91 rotates through the lost motion relative to the wheel 5, and the release clutch ring 6 engages the lug 61 (FIG. 8B), and rotates the release clutch ring 6 clockwise (FIG. 8C). Upon such rotation, the ratchet teeth 63 move across the spaces between the sprocket teeth 51 and by a camming action on the release clutch follower pin 102 rotate the stopper pawl 10 clockwise, whereupon the pawl tip 100 is disengaged from the ratchet teeth 53 on the wheel 5. When the wheel is so released from the pawl, the bias of the main winding spring 2 rotates the wheel clockwise, and the biases of both the main spring and the auxiliary spring rotate the belt reel in the belt-winding direction to take up the slack in the belt. After the tip 100 of the pawl 10 is first released from the ratchet teeth 53 of the wheel 5, the ratchet teeth 63 of the release clutch ring working against the follower 102 keep the tip 100 from reengaging the ratchet teeth 53. The engagement between the boss 57 on the wheel and the notch 64 in the release clutch ring keep the wheel and ring in circumferential register as the main spring 2 rotates the wheel.

The winding mechanism is at this point back in the configuration of FIG. 6. The occupant can now reduce the belt tension by pulling out the belt slightly once again. The mechanism, however, ensures that the slack in the belt will be taken up by restoring the bias of the main spring to take up the slack if taking up the slack requires more than one revolution of the belt reel; the auxiliary spring is called upon to take up the belt slack only up to a little less than one revolution of the reel.

When the user pulls out the belt to initiate the reduced-tension mode (FIG. 7), he or she may withdraw a length of belt large enough to cause the clutch plate to rotate counterclockwise far enough to move the depressed cam surface 33 counterclockwise past the follower pin 101. If that happens, both springs 2 and 8 will rotate the reel to take up the slack and rotate the wheel 5 and the clutch plate clockwise until the depressed cam surface 33 is positioned to accept the follower pin 101. Thereupon, the pawl pivots and engages the ratchet teeth 53, and the reduced-tension mode is attained.

When the mechanism is in the reduced-tension mode (FIG. 7) and the user leans forward or otherwise pulls out the belt, the reduced-tension mode will be temporarily interrupted and the full-tension mode restored if the arm 91 engages the lugs 51 and 61 (FIG. 7C) and the wheel 5 and clutch plate 6 are rotated counterclockwise far enough to move the depressed cam surface 33 away from the follower pin 101 but not far enough to cause the raised cam surface 35 to engage the follower 101, move the pawl clockwise and transfer the over-center spring 12 to the clockwise bias condition (see FIG. 5A). In this case the reduced-tension mode is automatically resumed when the belt rewinds enough to position the clutch plate with the depressed cam surface 33 opposite the follower pin 101. If the clutch plate 3 is rotated counterclockwise far enough to transfer the over-center spring to the clockwise bias (FIG. 5A), the occupant will have to reset the reduced-tension mode by pulling out the belt in the manner described above.

When the user disconnects the belt and releases it for rewinding onto the reel without pulling it out enough to deactivate the reduced-tension mode, the belt is initially wound onto the reel under the bias of the auxiliary spring 8 alone until the then-existing clockwise lost motion of the coupling plate (always less than one revolution) is taken up, whereupon the pawl 10 is released from the ratchet teeth 53 by operation of the release clutch ring 6, as described above (see also FIG. 8). The belt is thereafter wound onto the reel under the biases of both springs 2 and 8. The configuration of FIG. 4 is attained in the early stages of rewinding. Rotation of the clutch plate 3 is thereafter prevented by engagement of the protrusion 31 with the follower pin 101, and the pawl tip 100 is held out of engagement with the ratchet teeth 53 of the wheel 5 by the cam surface 22 so that the wheel 5 remains free to rotate in the belt-winding direction.

We claim:

1. A seat belt retractor having a belt-winding mechanism that includes a belt reel shaft mounted for rotation in a frame, a toothed wheel mounted for rotation relative to the reel shaft, a main spiral winding spring connected at one end to the frame and at the other end to the toothed wheel and biasing the toothed wheel rotationally in the belt-winding direction, an auxiliary spiral winding spring connected at one end to the toothed wheel and at the other end to the reel shaft to bias the reel shaft in the belt-winding direction relative to the toothed wheel, and means for stopping rotation of the toothed wheel in the belt-winding direction to remove the bias of the main winding spring from the reel shaft including a stopper pawl engageable with the toothed wheel, characterized in that the toothed wheel has ratchet teeth engageable by the stopper pawl such as to be prevented from rotating in the belt-winding direction upon such engagement, in that an over-center spring is connected between the frame and the stopper pawl and biases the pawl toward or away from engagement with the ratchet teeth of the toothed wheel, depending on the position to which the stopper pawl is moved, and in that a clutch plate is coupled by a clutch spring to the toothed wheel and has cam surfaces engageable with a clutch control follower pin on the stopper pawl to control the position of the stopper pawl in response to winding and unwinding movements of the belt reel shaft such as to hold the pawl out of engagement with the ratchet teeth when the belt is unwound from the reel and is then allowed to partly rewind onto the reel and to enable the stopper pawl to engage the ratchet teeth and prevent rotation of the gear wheel in the belt-winding direction when the belt is pulled out such as to rotate the reel shaft in the belt-unwinding direction after such partial rewinding.

2. A seat belt retractor according to claim 1 and further characterized in that the clutch plate has a protrusion having a first cam surface on one side engageable with the clutch control follower pin of the stopper pawl upon unwinding rotation of the clutch plate to move the stopper pawl to a first position in which the over-center spring biases it away from engagement with the ratchet teeth of the toothed wheel and a second cam surface on its other side engageable with the clutch control follower pin in response to winding rotation of the clutch plate to move the stopper pawl to a second position in which the over-center spring biases it toward but not into engagement with the ratchet teeth of the toothed wheel, and in that the clutch plate has a third cam surface engageable with the clutch control follower pin of the stopper pawl that permits the stopper pawl to move from the second position under the bias of the over-center spring to a third position in engagement with the ratchet teeth of the toothed wheel such as to prevent rotation of the toothed wheel in the belt-winding direction.

3. A seat belt retractor according to claim 1 and further characterized in that the toothed wheel has sprocket teeth evenly spaced at a certain pitch distance and projecting from its perimeter, in that the stopper pawl has a release follower pin receivable between the sprocket teeth when the stopper pawl is in engagement with the ratchet teeth of the toothed wheel, in that a release clutch ring is carried by the toothed wheel for limited relative rotation, and in that the release clutch ring has ratchet teeth arranged at the said pitch distance in overlapping relation to the sprocket teeth and engageable upon rotation of the release clutch ring in the belt-winding direction relative to the toothed wheel with the release follower pin so as to move the stopper pawl out of engagement with the ratchet tooth of the toothed wheel and enable the main winding spring to drive the toothed wheel in the belt-winding direction.

4. A seat belt retractor according to claim 3 and further characterized in that a coupling plate having a projecting arm is affixed to the reel shaft for rotation therewith, and in that the release clutch ring has a lug that is engageable by the projecting arm upon rotation of the belt reel in the belt-winding direction so as to rotate the release clutch ring and cause the stopper pawl to be moved out of engagement with the ratchet teeth of the toothed wheel.

5. A seat belt retractor according to claim 1 and further characterized in that the toothed wheel has a lug that is engageable by the projecting arm of the coupling plate to transmit rotational driving force from the toothed wheel to the reel shaft in the belt-winding direction and to transmit rotational driving force from the reel shaft to the toothed wheel in the belt-unwinding direction with lost motion in both rotational directions, such lost motion enabling the auxiliary spring alone to impart rotational driving force to the reel shaft when the stopper pawl engages the ratchet teeth of the toothed wheel.

* * * * *